(12) United States Patent
Sasaki (10) Patent No.: US 6,603,641 B1
(45) Date of Patent: Aug. 5, 2003

(54) THIN FILM MAGNETIC HEAD AND METHOD OF MANUFACTURING THE SAME

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/440,259

(22) Filed: Nov. 15, 1999

(30) Foreign Application Priority Data

Nov. 18, 1998 (JP) .............................. 10-327806

(51) Int. Cl.⁷ .............................. G11B 5/127; G11B 5/17
(52) U.S. Cl. ..................... 360/317; 29/603.24; 360/123
(58) Field of Search ................. 360/317, 123, 360/125, 126; 29/603.14, 603.23, 603.24

(56) References Cited

U.S. PATENT DOCUMENTS 5,438,747 A   8/1995   Krounbi et al.
6,504,676 B1 * 1/2003   Hiner et al.

FOREIGN PATENT DOCUMENTS

JP   2-132616   5/1990
JP   2-247811   10/1990
JP   7-262519   10/1995

* cited by examiner

Primary Examiner—George J. Letscher
(74) Attorney, Agent, or Firm—Oliff & Berridge, PLC (57) ABSTRACT

A bottom pole is divided into a bottom pole tip and a bottom pole layer, and the bottom pole tip is formed on the flat surface of the bottom pole layer. An insulating layer is formed in a concave region adjacent to the bottom pole tip, and the throat height is determined by the end of the insulating layer on the bottom pole tip side. The film thickness of the second layer of thin film coil is thicker than that of the first layer of thin film coil. The film thickness of the first thin film coil is determined by the film thickness of the bottom pole tip. The whole coil resistance of the first and the second thin film coils is decreased by making the second thin film coil thicker than the first thin film coil. Thereby, the first thin film coil can be formed as thin as possible without increasing the coil resistance and the read write distance (RWD) can be shortened while the recording and reproducing capacity can be increased.

22 Claims, 8 Drawing Sheets

THIN FILM MAGNETIC HEAD AND METHOD OF MANUFACTURING THE SAME

BACKGROUND OF THE INVENTION

1. Field of the Invention

The invention relates to a composite thin film magnetic head having an inductive-type magnetic transducer for writing and a magnetoresistive element for reproducing, and a method of manufacturing the same.

2. Description of the Related Art

In recent years, performance improvement in thin film magnetic heads has been sought in accordance with an increase in surface recording density of a hard disk drive. As a thin film magnetic head, a composite thin film magnetic head has been widely used. The composite thin film magnetic head has a layered structure having a recording head with an inductive-type magnetic transducer for writing and a reproducing head with a magnetoresistive element (referred to as MR element in the followings) for reading-out. As MR elements, there are an AMR element that utilizes the anisotropic magnetoresistance effect (referred to as AMR effect in the followings) and a GMR element that utilizes the giant magnetoresistance effect (referred to as GMR effect in the followings). A reproducing head using the AMR element is called an AMR head or simply an MR head. A reproducing head using the GMR element is called a GMR head. The AMR head is used as a reproducing head whose surface recording density is more than 1 gigabit per square inch. The GMR head is used as a reproducing head whose surface recording density is more than 3 gigabit per square inch.

In general, an AMR film is a film made of a magnetic substance which exhibits the MR effect and has a single-layered structure. In contrast, many of the GMR films have a multi-layered structure consisting of a plurality of films. There are several types of producing mechanisms of the GMR effect. The layer structure of the GMR film depends on those mechanisms. The GMR films include a superlattice GMR film, a spin valve film, a granular film and so on. The spin valve film is most sufficient since the film has a relatively simple structure, exhibits a great change in resistance in a low magnetic field, and is suitable for mass production.

As a primary factor for determining the performance of a reproducing head, there is a pattern width, especially an MR height. The MR height is the length (height) between the end of an MR element closer to an air bearing surface and the other end. The MR height is originally controlled by the amount of grinding when the air bearing surface is processed. The air bearing surface (ABS) is a surface of a thin film magnetic head facing a magnetic recording medium and is also called a track surface.

Performance improvement in a recording head has also been expected in accordance with the performance improvement in a reproducing head. It is necessary to increase the track density of a magnetic recording medium in order to increase the recording density among the performance of a recording head. In order to achieve this, it is necessary to develop a recording head with a narrow track structure, the width of a bottom pole and a top pole sandwiching a write gap on the air bearing surface being reduced to the order of some microns to submicron. Semiconductor process technique is used to achieve the narrow track structure.

Another factor which determines the performance of a recording head is the throat height (TH). The throat height is the length (height) of a portion (magnetic pole portion) from the air bearing surface to an edge of an insulating layer which electrically isolates the thin film coil. Reducing the throat height is desired in order to improve the performance of a recording head. The throat height is also controlled by the amount of polishing when the air bearing surface is processed.

In order to improve the performance of a thin film magnetic head, it is important to form the recording head and the reproducing head in well balance.

Now, an example of a method of manufacturing a composite thin film magnetic head will be described with reference to FIGS. 9A, 9B to FIGS. 14A, 14B as an example of a method of manufacturing a thin film magnetic head of the related art.

Figure 9A:
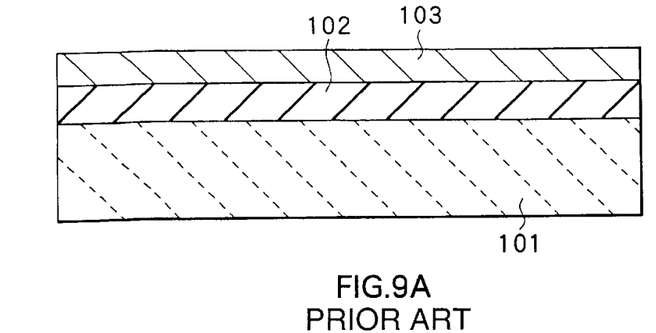
FIGS. 9A and 9B are cross sections for describing the process of manufacturing a thin film magnetic head of the related art.
Figure 9B:
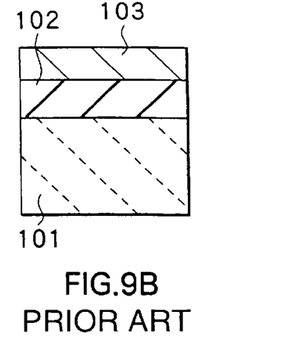

As shown in FIGS. 9A and 9B, an insulating layer 102 made of, for example, alumina (aluminum oxide, $Al_2O_3$) is formed in a thickness of about 5 to 10 μm on a substrate 101 made of, for example, altic ($Al_2O_3$·TiC). Then, a bottom shield layer 103 for a reproducing head made of, for example, permalloy (NiFe) is formed on the insulating layer 102.

Figure 10A:
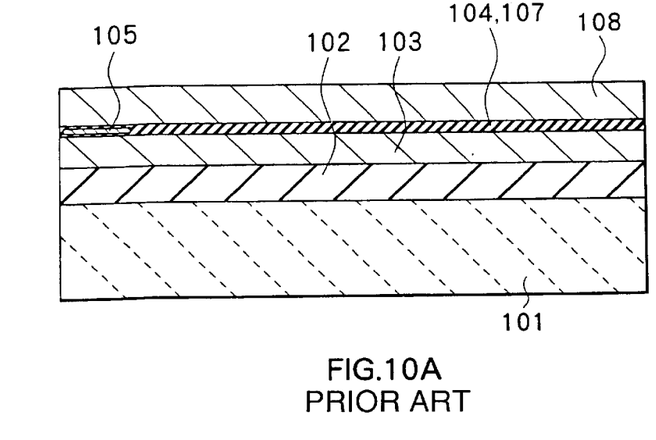
FIGS. 10A and 10B are cross sections for describing the following step shown in FIGS. 9A and 9B.
Figure 10B:
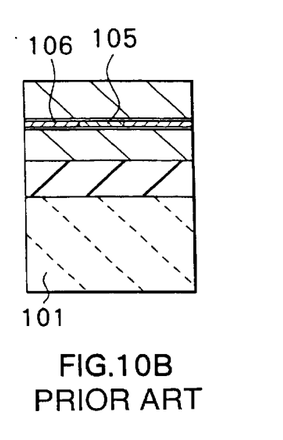

Next, as shown in FIGS. 10A and 10B, for example, alumina of about 100–200 nm in thickness is deposited on the bottom shield layer 103 to form a shield gap film 104. Next, an MR film 105 of tens of nanometers in thickness for making up the MR element for reproducing is formed on the shield gap film 104, and photolithography with high precision is applied to obtain a desired shape. Next, a lead terminal layer 106 for the MR film 105 is formed by lift-off method. Next, a shield gap film 107 is formed on the shield gap film 104, the MR film 105 and the lead terminal layer 106, and the MR film 105 and the lead terminal layer 106 are buried in the shield gap films 104 and 107. Next, a top shield-cum-bottom pole (called bottom pole in the followings) 108 of about 3 μm in thickness made of, for example, permalloy (NiFe), which is a material used for both the reproducing head and the recording head, is formed on the shield gap film 107.

Figure 11A:
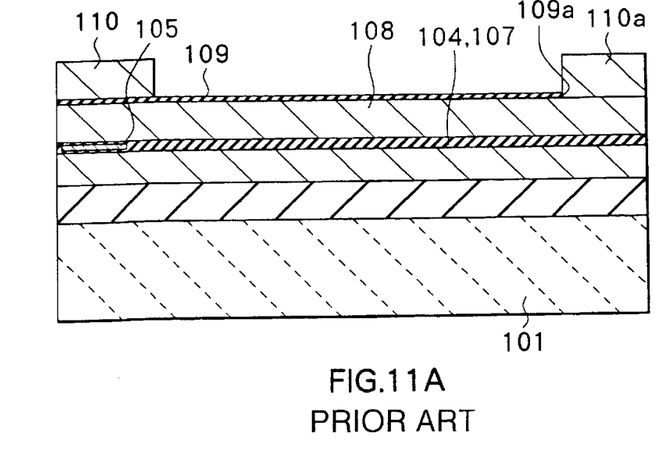
FIGS. 11A and 11B are cross sections for describing the following step shown in FIGS. 10A and 10B.
Figure 11B:
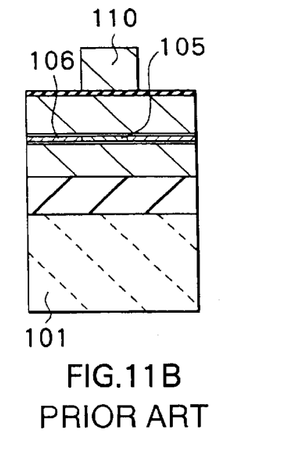

Next, as shown in FIGS. 11A and 11B, a write gap layer 109 of about 200 nm in thickness made of an insulating layer such as an alumina film is formed on the bottom pole 108. Then, an opening 109a for connecting the top pole and the bottom pole is formed through patterning the write gap layer 109 by photolithography. Next, a pole tip 110 is formed of a magnetic material made of permalloy (NiFe) and nitride ferrous (FeN) through plating method, and a connecting-portion pattern 110a of the top pole and the bottom pole is formed. The bottom pole 108 and a top pole layer 116 which is to be described later are connected by the connecting-portion pattern 110a and so that forming a through hole after CMP (Chemical and Mechanical Polishing) procedure, which is to be described later, becomes easier.

Figure 12A:
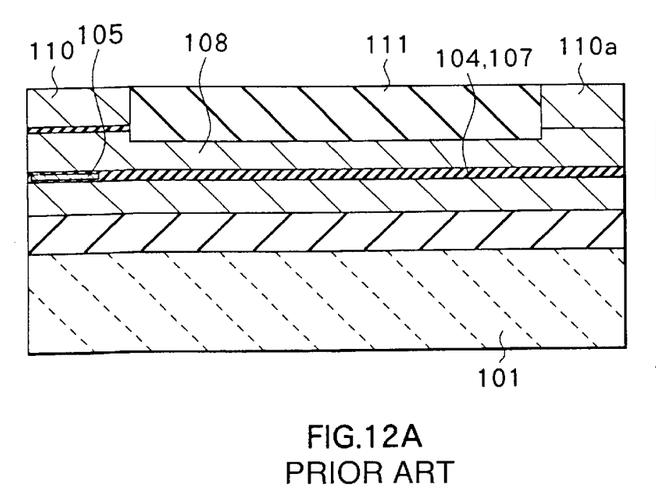
FIGS. 12A and 12B are cross sections for describing the following step shown in FIGS. 11A and 11B.
Figure 12B:
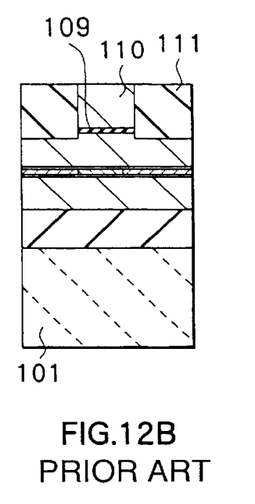

Next, as shown in FIGS. 12A and 12B, the write gap layer 109 and the bottom pole 108 are etched about 0.3–0.5 μm by ion milling using the pole tip 110 as a mask. By etching to the bottom pole 108 to be a trim structure, widening of effective write track width can be avoided (that is, suppressing spread of magnetic flux in the bottom pole when data is being written). Then, after an insulating layer 111 of about 3 μm, made of, for example, alumina is formed all over the surface, the whole surface is planarized by CMP.

Figure 13A:
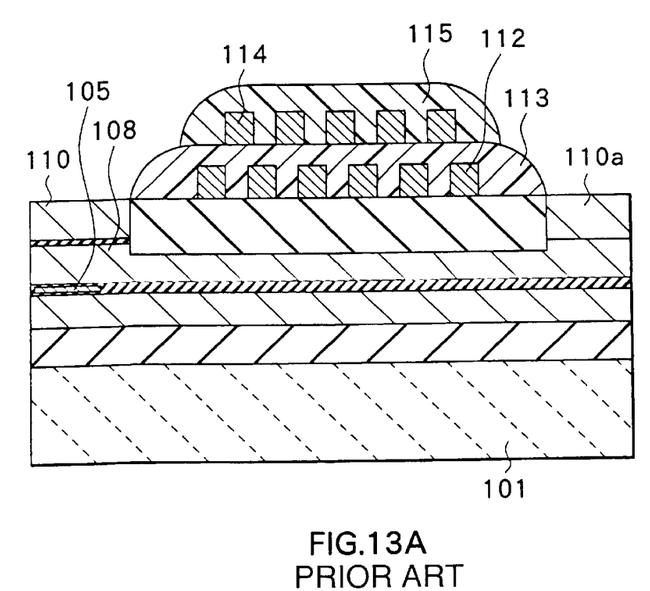
FIGS. 13A and 13B are cross sections for describing the following step shown in FIGS. 12A and 12B.
Figure 13B:
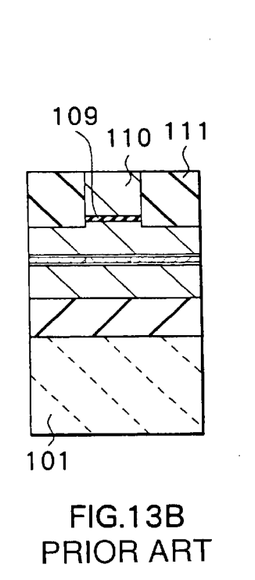

Next, as shown in FIGS. 13A and 13B a thin film coil 112 for an inductive-type recording head made of, for example, copper (Cu) is selectively formed on the insulating layer 111 by, for example, plating method. Further, a photoresist film 113 is formed in a desired pattern on the insulating layer 111 and the thin film coil 112 by photolithography with high precision. Then, a heat treatment of a predetermined temperature is applied to palanarize the photoresist film 113 and to insulate between the turns of the thin film coil 112. Likewise, a thin film coil 114 and a photoresist film 115 are formed on the photoresist film 113, and a heat treatment of a predetermined temperature is applied to planarize the photoresist film 115 and to insulate between the turns of the thin film coils 114.

Figure 14A:
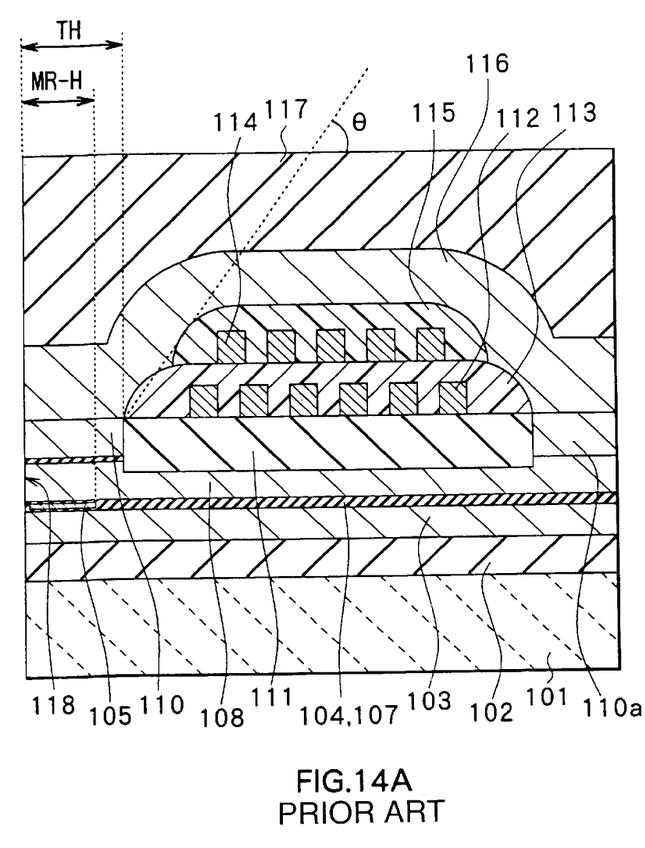
FIGS. 14A and 14B are cross sections for describing the following step shown in FIGS. 13A and 13B.
Figure 14B:
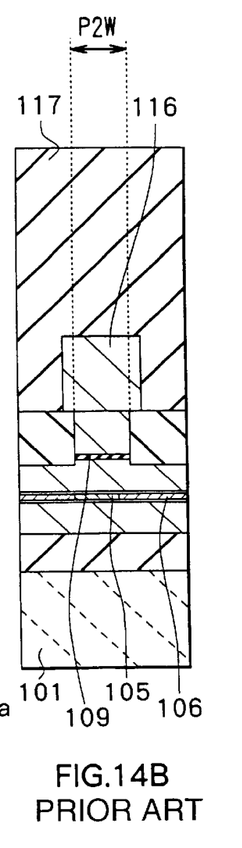

Next, as shown in FIGS. 14A and 14B, a top yoke-cum-top pole layer (called a top pole layer in the followings) 116 made of, for example, permalloy, which is a magnetic material for recording heads, is formed on the top pole 110, and the photoresist films 113 and 115. The top pole layer 116 is in contact with the bottom pole 108 in a rearward position of the thin film coils 112 and 114, while being magnetically coupled to the bottom pole 108. Then, an overcoat layer 117 made of, for example, alumina is formed on the top pole layer 116. At last, a track surface (air bearing surface) 118 of the recording head and the reproducing head is formed through performing machine processing on the slider to complete a thin film magnetic head.

In FIGS. 14A and 14B, TH represents the throat height and MR-H represents the MR height, respectively. P2W represents the track (magnetic pole) width.

As an factor for determining the performance of a thin film magnetic head, there is an apex angle as represented by θ in FIG. 14A besides the throat height TH and the MR height MR-H and so on. The apex angle is an angle between a line connecting the corner of a side surface of the photoresist films 113 and 115 on the track surface side and an upper surface of the top pole layer 116.

To improve the performance of a thin film magnetic head, it is important to precisely form the throat height TH, the MR height MR-H, the apex angle θ and the track width P2W as shown in FIGS. 14A and 14B.

Especially in recent years, submicron measurement of 1.0 μm or less is required for the track width P2W in order to make a high surface density recording possible, that is, to form a recording head with a narrow track structure. To achieve this, a technique of processing a top pole to submicron using a semiconductor processing technique is required. Also, using the magnetic materials having higher saturation flux density for the magnetic pole is desired in accordance with being a narrow track structure.

The problem is that it is difficult to minutely form the top pole layer 116 on a coil portion (apex area) which is protruded like a mountain covered with photoresist films (for example, the photoresist films 113 and 115 shown in FIG. 14A).

As a method of forming the top pole, frame plating method is used as disclosed in, for example, Japanese Patent Application laid-open in Hei 7-262519. When the top pole is formed by the frame plating method, first, a thin electrode film made of, for example, permalloy is formed all over the apex area. Next, a frame for plating is formed by applying photoresist on it, and patterning it through photolithography. Then, the top pole is formed through plating method using the electrode film formed earlier as a seed layer.

There is, for example, 7–10 μm or more difference in height in the apex area described above. If the film thickness of the photoresist formed on the apex area is required to be 3 μm or more, a photoresist film of 8–10 μm or more in thickness is formed in the lower part of the apex area since the photoresist with liquidity gathers into a lower area. To form a narrow track as described, a pattern with submicron width is required to be formed with a photoresist film. Accordingly, it is necessary to form a micro pattern with submicron width with a photoresist film of 8–10 μm or more in thickness, however, it has been extremely difficult.

During an exposure of photolithography, a light for the exposure reflects by an electrode film made of, for example, permalloy, and the photoresist is exposed also by the reflecting light causing deformation of the photoresist pattern. As a result, the top pole can not be formed in a desired shape and so on, which means, its side walls take a round shape. As described, it has been extremely difficult with the related art to precisely control the track P2W and to precisely form the top pole to have a narrow track structure.

For the reasons described above, as shown in the procedure of an example of the related art in FIGS. 11A and 11B to FIGS. 14A and 14B, a method of connecting the pole tip 110 and a yoke-cum-top pole layer 116 after forming a track width of 1.0 μm or less with the pole tip 110 which is effective for forming a narrow track of a recording head, that is, a method of dividing the regular top pole into the pole tip 110 for determining the track width and the top pole layer 116 which becomes the yoke for inducing magnetic flux is employed (Ref. Japanese Patent Application laid-open Sho 62-245509, and Sho 60-10409). By dividing the top pole into two as described, the pole tip 110 can be minutely processed to submicron width on a flat surface of the write gap layer 109.

However, in this thin film magnetic head, there have still existed problems as follows.

(1) In a magnetic head of the related art, the throat height is determined by the length from the track surface 118 of the pole tip 110 to the further end. However, if the width of the pole tip 110 becomes narrower, the pattern edge is formed taking a rounded shape by photolithography. Therefore, the throat height which requires the measurement with high precision is not formed to be uniform. As a result, the track width of a magnetoresistive element and the throat height can not be formed in well balance at the time of processing the track surface and during the step of polishing. For example, if the track width requires to be 0.5 to 0.6 μm, the further edge from the track surface 118 of the pole tip 110 shifts from the throat height zero position to the track surface side so that there is a large write gap. As a result, there has often occurred a problem that writing of recording data could not be performed.

(2) As described, in a magnetic head of the related art, the track width of a recording head is determined by the pole tip 110, which is one of the top pole being divided into two. Therefore, the other top pole layer 116 is not required to be processed as minute as the pole tip 110. However, the position of the top pole layer 116 over the pole tip 110 is determined by positioning of photolithography. Accordingly, if both of the top pole layer 116 and the pole tip 110 shift largely to one side when looking at them from the track surface 118 (FIG. 14A) side, so-called a side-write, which means writing is also performed in the top pole layer 116, occurs. As a result, the effective track width becomes wider and writing is also performed in a region other than the designated data recording region in a hard disk.

Furthermore, if the track width of a recording head becomes very minute, especially equal to or less than 0.5 μm, the process precision with submicron width is also required in the top pole layer 116. As a result, if the difference in the sizes of the pole tip 110 and the top pole layer 116 in the lateral direction is too large when looking at them from the track surface 118 (FIG. 14A) side, as described above, a side-write occurs. That is, writing is also performed in a region other than the designated data recording region.

Accordingly, not only the pole tip 110 but also the top pole layer 116 is required to be processed to submicron. However, there has been still a large difference in height of the apex area under the top pole layer 116, as described, so that fine processing of the top pole layer 116 has been difficult.

(3) In a magnetic head of the related art, there has been another problem that it has been difficult to shorten the yoke length. The shorter the coil pitch is, the shorter the yoke length of a head becomes. Accordingly, a recording head which is excellent especially in high frequency characteristic can be formed. However, if the coil pitch becomes extremely small, the distance from the throat height zero position to the periphery end of the coil has become a primal factor for preventing the yoke length from shortening. The yoke length of a two-layered coil can be more shortened compared to that of a single-layered coil. Therefore, many of the recording heads for high frequency employ the two-layered coils.

In a magnetic head of the related art, after forming a first layer of coil, a photoresist film of about 2 μm in thickness is formed as an insulating film between the turns of the coil. Therefore, a small apex area taking a round shape is formed in the periphery end of the first layer of coil. Then, a second layer of coil is to be formed thereon. However, the second layer of coil can not be formed since a seed layer of the coil can not be etched on the slope of the apex area and the coil short-circuits. Therefore, the second layer of coil is required to be formed on a flat area. If the coil is 2 to 3 μm in thickness and the insulating film between the turns of the coil is 2 μm in thickness and the angle of the slope of the apex area is 45 to 55°, the distance from periphery end of the coil to the area adjacent to the throat height zero position is required to be 8 to 10 μm which is twice as much 4 to 5 μm (the distance from the contact area of the top pole and the bottom pole to the periphery end of the coil is also required to be 4 to 5 μm). This has prevented the yoke length from shortening. For example, when forming two layers of coil with eleven turns and the line/space being 1.0 μm/1.0 μm, the length of the coil which occupies the yoke length is 11 μm provided that the first layer has six turns and the second layer has five turns. Therefore, shortening of the yoke length can not be performed further since the apex area of the periphery end of the above-mentioned coil is required to be 8 to 10 μm. This has prevented the high frequency characteristic from improving.

If the yoke length of a thin film magnetic head can be shortened, the length of the coil can be shortened as well. Accordingly, the film thickness of the coil can be made thinner (e.g. from 2 to 3 μm of the related art to about 1.0 to 1.5 μm). Thereby, Read-Write-Distance (RWD) can be made smaller (detail will be described later), and recording and reproducing capacity can be increased. However, there has been a problem that the electrical resistance value of the coil becomes large when the thickness of the thin film coil becomes as thin as about 1.5 μm.

As the related art of the invention, there are Japanese Patent Application laid-open Hei 2-132616 and Japanese Patent Application laid-open Hei 2-247811. Japanese Patent Application Hei 2-132616 discloses a technique in which the cross section of the upper coil (the second coil conductor) facing the top magnetic film is made substantially smaller than that of the lower coil (the first coil conductor) facing the bottom magnetic film. However, with this technique, RWD can not be made smaller, and recording and reproducing capacity can not be increased. Hence, precise control of the throat height of a recording head can not be achieved. On the other hand, Japanese Patent Application laid-open Hei 2-247811 discloses a technique in which the resistance value of the coil is decreased by widening the width of the upper coil than that of the lower coil. With this technique, although RWD can be made smaller, shortening the yoke length is still difficult. In addition, the above-mentioned problems such as precise control of the throat height of a recording head can not be solved, either.

The invention is designed to overcome the foregoing problems. The first object is to provide a thin film magnetic head in which: precise control of the throat height of a recording head can be performed; the yoke length can be shortened; film thickness can be made thinner without increasing the electrical resistance value of the thin film coil; and the high frequency characteristic and the surface recording density can be improved, and a method of manufacturing the same.

The second object is to provide a thin film magnetic head in which, in addition to the above-mentioned effects, not only the pole tip but also the top pole layer can be minutely processed to submicron width and the characteristic of the recording head is improved, and a method of manufacturing the same.

SUMMARY OF THE INVENTION

A thin film magnetic head of the invention includes: a magnetoresistive element; at least two magnetic layers including a first magnetic pole and a second magnetic pole, which are magnetically coupled while part of the side facing a recording medium oppose each other with a write gap layer in between; and a thin film coil with two or more layers for generating magnetic flux; wherein the thin film magnetic head comprises: a first magnetic layer formed on the side closer to the magnetoresistive element, which is one of the two magnetic layers; a first magnetic pole which is formed separately from the first magnetic layer while the opposite surface of the surface adjacent to the write gap layer is magnetically coupled to part of the region of the first magnetic layer; an insulating layer which is formed of an inorganic material and is formed extendedly at least from a surface of the first magnetic pole, which is the opposite side of a surface facing the recording medium, to one of the surface of the first magnetic layer; a first thin film coil formed with at least part of the film-thickness direction being located in the region where the insulating layer is formed; a second magnetic layer including a second magnetic pole which opposes the first magnetic pole with the write gap layer in between; and a second thin film coil with one, two or more layers with thicker film thickness than the first thin film coil, which is formed in a position more distant from the magnetoresistive element than the first thin film coil while electrically connected to the first thin film coil.

A method of manufacturing a thin film magnetic head of the invention includes the steps of: forming a first magnetic layer after forming a magnetoresistive element, and forming a first magnetic pole on the first magnetic layer to be magnetically coupled to part of the region of the first magnetic layer; forming an insulating layer made of an inorganic material at least from a surface of the first magnetic pole, which is opposite to a surface facing the recording medium, to one of the side of the first magnetic layer extendedly; forming a first thin film coil in the concave region where the insulating layer is formed; forming a second thin film coil with one, two or more layers with thicker thickness than that of the first thin film coil while electrically connecting to the first thin film coil after forming the first thin film coil; and forming a write gap layer at least on the first magnetic pole and then forming a second magnetic layer including the second magnetic pole so as to cover the second thin film coil.

In a thin film magnetic head and a method of manufacturing the same of the invention, a first magnetic pole is formed being protruded on a first magnetic pole layer and a first thin film coil is formed in a concave area adjacent to the first magnetic pole. A second thin film coil is formed thicker than the first thin film coil. Accordingly, an insulating layer made of an inorganic material can be buried in the concave area adjacent to the first magnetic pole. Thus, the throat height is precisely determined by the end of the opposite side of the track surface of the first magnetic pole.

Furthermore, by burying the thin film coil inside the concave adjacent to the first magnetic pole, the difference in height in the apex area can be decreased compared to that of the related art. As a result, in the step hereafter, the difference in thickness of the photoresist film in the top and the bottom of the apex area can be decreased when forming a second magnetic layer by photolithography. As a result, the second magnetic layer can be minutely formed to submicron measurement.

In addition, the resistance of the coil is decreased and the fist thin film coil can be formed as thin as possible since the second thin film coil is thicker than the first thin film coil. As a result, recording and reproducing capacity can be increased by making the RWD smaller and the skew angle larger.

In addition to the above-mentioned configuration, a thin film magnetic head and a method of manufacturing the same of the invention, the following condition can be applicable.

In a thin film magnetic head and a method of manufacturing the same of the invention, the second magnetic pole may be formed on the write gap layer which is formed on the first magnetic pole by dividing the second magnetic pole and the second magnetic layer. Then the second magnetic layer may be formed to be magnetically coupled to the second magnetic pole.

In a thin film magnetic head and a method of manufacturing the same of the invention, the film thickness of the second magnetic pole may be formed thicker than that of the first magnetic pole.

In a thin film magnetic head and a method of manufacturing the same of the invention, the length from the surface of the first magnetic pole opposing the recording medium may be formed equal to the throat height of a recording head. In other words, in a thin film magnetic head and a method of manufacturing the same of the invention, the first magnetic pole is separated from the first magnetic layer and is formed being protruded on the first magnetic layer. Thus, an insulating layer made of an inorganic material is formed adjacent to the first magnetic pole. As a result, the throat height is precisely determined by making the length from the surface of the first magnetic pole facing the recording medium to the inward direction equal to the throat height of the recording head.

In a thin film magnetic head and a method of manufacturing the same of the invention, a first insulating layer may be formed extendedly from a surface of the first magnetic pole, which is opposite to a surface facing the recording medium, to one of the surface of the first magnetic layer; and a second insulating layer may be formed at least in between the turns of the first thin film coil.

In a thin film magnetic head and a method of manufacturing the same of the invention, the surface of the second insulating layer which is opposite to the surface adjacent to the first magnetic layer may be planarized to be substantially the same surface as that of the first magnetic pole which is opposite to the surface adjacent to the write gap layer.

In a thin film magnetic head and a method of manufacturing the same of the invention, the width along the surface of the first magnetic pole facing the recording medium may be formed wider than that of the second magnetic pole.

Furthermore, in a thin film magnetic head and a method of manufacturing the same of the invention, the end of the surface of the second magnetic layer facing the recording medium may be formed in a rearward position of the surface facing the recording medium In a thin film magnetic head and a method of manufacturing the same of the invention, a third insulating layer may be further formed extendedly at least from a surface of the second magnetic pole, which is opposite to a surface facing the recording medium, to the surface of the write gap layer which is opposite to the surface adjacent to the second magnetic pole.

Furthermore, in a thin film magnetic head and a method of manufacturing the same of the invention, the second thin film coil may be covered with other insulating layer than the first to the third insulating layer in between the third insulating layer and the second magnetic layer.

Moreover, in a thin film magnetic head and a method of manufacturing the same of the invention, the third insulating layer and the other insulating layer may be planarized to be substantially the same surface as that of the second magnetic pole which is opposite to the surface adjacent to the write gap layer.

Other and further objects, features and advantages of the invention will appear more fully from the following description.

DETAILED DESCRIPTION OF THE PREFERRED EMBODIMENTS

Preferred embodiments of the invention will be described in detail in the followings with reference to the drawings.

[First Embodiment]

FIGS. 1A, 1B to FIGS. 6A, 6B show the manufacturing steps of a composite thin film magnetic head, respectively, as a thin film magnetic head of a first embodiment of the invention. In FIGS. 1A, 1B to 6A, 6B, "A" shows a cross section vertical to the track surface (ABS) while "B" shows a cross section parallel to the track surface of the magnetic pole, respectively.

First, the configuration of a composite thin film magnetic head according to the embodiment will be described with reference to FIGS. 6A and 6B. The magnetic head comprises a magnetoresistive reading-out head for reproducing (referred as a reproducing head in the followings) 1A and an inductive recording head for recording (referred as a recording head in the followings) 1B.

The reproducing head 1A is a pattern of a magnetoresistive film (called MR film in the followings) 15 formed on a substrate 11 made of, for example, altic ($Al_2O_3 \cdot TiC$) with an insulating layer 12 formed of, for example, alumina (aluminum oxide, $Al_2O_3$), a bottom shield layer 13 formed of, for example, ferrous aluminum silicide (FeAlSi) and a shield gap layer 14 formed of, for example, aluminum oxide ($Al_2O_3$, called alumina in the followings) in between in this order. Also a lead terminal layer 15a made of a material which does not diffuse onto the MR film such as tantalum (Ta) or tungsten (W) or the like is also formed on the shield gap layer 14, and the lead terminal layer 15a is electrically connected to the MR film 15. The MR film 15 is formed of various kinds of materials having magnetoresistive effect such as permalloy (NiFe alloy), nickel (Ni)—cobalt (Co) alloy and so on. A shield gap layer 17 made of, for example, alumina is stacked on the MR film 15 and the lead terminal layer 15a. That is, the MR film 15 and the lead terminal layer 15a are buried in the shield gap layers 14 and 17. The MR film 15 may be an AMR film, a GMR film or any other magnetoresistive films.

The recording head 1B is formed by forming a top pole on the reproducing head 1A with a bottom pole-cum-top shield layer for the MR film 15, and a write gap layer 22 in between.

In the embodiment, the bottom pole is formed being divided to a bottom pole layer (bottom pole) 18 formed on the shield gap layer 17 and a bottom pole tip 19a formed on the bottom pole layer 18 on the track surface side. The top pole is also divided into two: one is a top pole tip 23a formed on the bottom pole tip 19a with the write gap layer 22 in between; and the other is a yoke-cum-top pole layer (top pole) 25 formed to be in contact with the top pole tip 23a along the top surface of the apex area including a coil to be described later. The top pole layer 25 is magnetically coupled to the bottom pole layer 18 through a top connecting portion 23b and a bottom connecting portion 19b in a position (right-hand side in FIG. 6A) opposite to the track surface of the apex area.

The bottom pole layer 18, the bottom pole tip 19a, the bottom connecting portion 19b, the top pole tip 23a, the top connecting portion 23b and the top pole layer 25 are formed of, for example, high saturated flux density material (Hi-Bs material) such as NiFe (Ni: 50% by weight, Fe: 50% by weight), NiFe (Ni: 80% by weight, Fe: 20% by weight), FeN, FeZrNP or CoFeN, respectively.

In the recording head 1B, the bottom pole tip 19a facing the top pole tip 23a has a trim structure in which part of the surface is processed to be protruded. Hence, widening of the effective writing track width, that is, spreading of magnetic flux in the bottom pole can be suppressed at the time of writing data.

In the embodiment, the bottom pole layer 18 corresponds to the first magnetic layer of the invention while the bottom pole tip 19a corresponds to the first magnetic pole of the invention, respectively. In addition, the top pole tip 23a corresponds to the second magnetic pole of the invention while the top pole layer 25 corresponds to the second magnetic layer of the invention respectively.

In the embodiment, a thin film coil 21, which is the first layer, is formed in a concave region adjacent to the bottom pole tip 19a and the bottom connecting portion 19b on the bottom pole layer 18. In other words, an insulating layer 20a is formed on the inner-wall surface (bottom surface and sidewall surface) of the concave region, and the thin film coil 21 is formed thereon. The space between the turns of the thin film coil 21 is buried with an insulating layer 20b and the surface of the insulating layer 20b and the surface of the bottom pole tip 19a are planarized so that they form the same surface. As a result, the difference in the height of the apex area including a thin film coil 24 to be described later is decreased for the height of the thin film coil 21. The insulating layer 20a corresponds to the first insulating layer of the invention while the insulating layer 20b corresponds to the second insulating layer.

A write gap layer 22 is extended onto the planarized insulating layer 20b and the thin film coil 21. An insulating layer 20c is formed in the concave region adjacent to the top pole tip 23a and the top connection area 23b on the write gap layer 22. The thin film coil 24, which is the second layer, is formed on the insulating layer 20c. The thin film coil 24 is buried in an insulating layer 20d made of, for example, alumina. In the embodiment, the film thickness of the thin film coil 24 is thicker than that of the thin film coil 21. For example, if the film thickness of the thin film coil 21 is 1.0 to 2.0 μm, the film thickness of the thin film coil 24 is 2.0 to 3.0 μm. The thin film coils 21 and 24 are electrically connected to each other through the coil connecting portions 21a and 24a in a backward position of the top connecting portion 23b and the bottom connecting portion 19b. The insulating layer 20c corresponds to the third insulating layer of the invention while the insulating layer 20d corresponds to other insulating layers of the invention.

A yoke-cum-top pole layer 25 is formed on the insulating layer 20d. The top pole layer 25 is covered with an overcoat layer 26.

In the magnetic head of the embodiment, information is read out from a magnetic disk (not shown n figure) using a magnetoresistive effect of the MR film 15 in the reproducing head 1A. Information is written on the magnetic disk using changes in a magnetic flux between the top pole tip 23a and the bottom pole tip 19a generated by the thin film coils 21 and 24.

Next, a method of manufacturing a composite thin film magnetic head will be described.

Figure 1A:
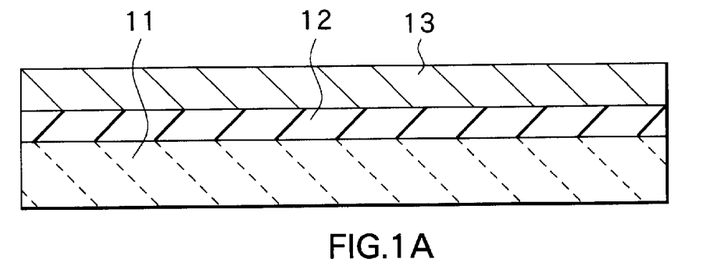
FIGS. 1A and 1B are cross sections for describing the process of manufacturing a thin film magnetic head according to a first embodiment of the invention.
Figure 1B:
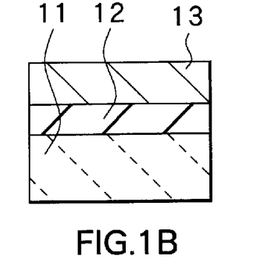

In the embodiment, first, as shown in FIGS. 1A and 1B, the insulating layer 12 made of, for example, alumina ($Al_2O_3$) is formed about 3–5 μm in thickness on a substrate 11 made of, for example, altic ($Al_2O_3 \cdot TiC$) by, for example, sputtering method. Next, a bottom shield layer 13 for a reproducing head is formed by selectively forming permalloy of about 3 μm in thickness on the insulating layer 12 by plating method using a photoresist film as a mask. Then, an alumina film (not shown in figure) of about 4–6 μm in thickness is formed by sputtering or CVD (Chemical Vapor Deposition), and is planarized by CMP.

Figure 2A:
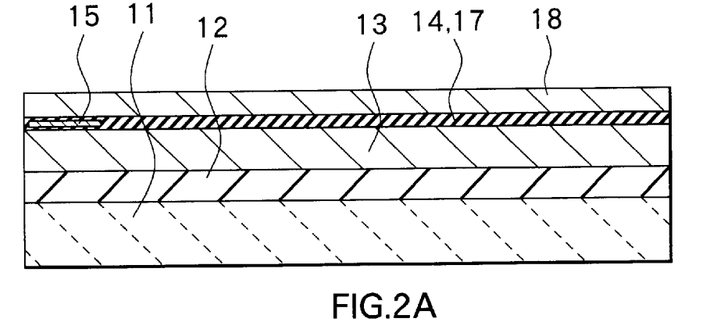
FIGS. 2A and 2B are cross sections for describing the following step shown in FIGS. 1A and 1B.
Figure 2B:
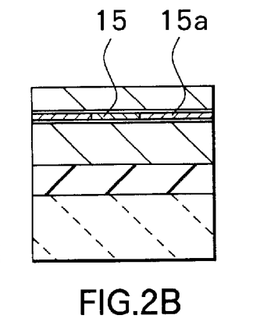

Next, as shown in FIGS. 2A and 2B, a shield gap layer 14 is formed on the bottom shield layer 13 through depositing, for example, alumina to 100–200 nm in thickness by sputtering. Then, an MR film 15 for forming an MR element for reproducing is formed to tens of nanometers in thickness on the shield gap layer 14 and is processed to be a desired shape by photolithography with high precision. Then, a lead terminal layer 15a for the MR film 15 is formed by lift-off method. Next, a shield gap layer 17 is formed on the shield gap layer 14, the MR film 15 and the lead terminal layer 15a, and the MR film 15 and the lead terminal layer 15a are buried in the shield gap layers 14 and 17.

Then, a top shield-cum-bottom pole layer (bottom pole) 18 made of, for example, permalloy (NiFe) is formed about 1.0 to 1.5 μm in thickness on the shield gap layer 17.

Figure 3A:
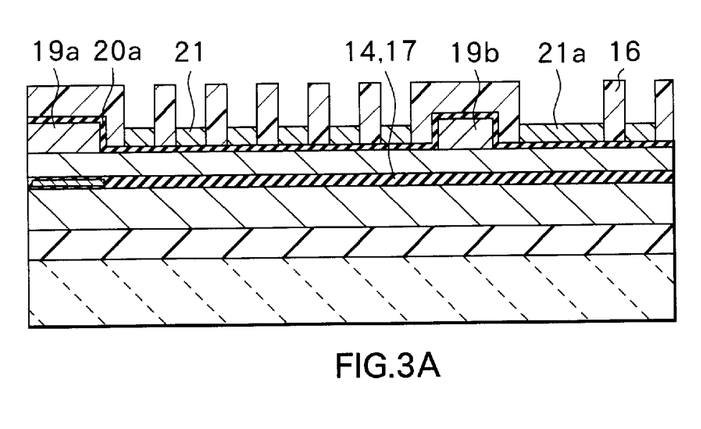
FIGS. 3A and 3B are cross sections for describing the following step shown in FIGS. 2A and 2B.
Figure 3B:
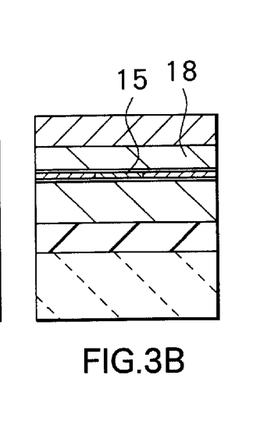

Next, as shown in FIGS. 3A and 3B, a bottom pole tip 19a and a bottom connecting portion 19b are formed about 2.0 to 2.5 μm in thickness on the bottom pole layer 18. At this time, the tip of the bottom pole tip 19a on the track side is to be in the position adjacent to the MR (GMR) height zero position while the opposite side of the track surface of the bottom pole tip 19a is in the throat height zero position. The bottom pole tip 19a and the bottom connecting portion 19b may be formed of a plating film such as NiFe as described above. They may also be formed of a sputter film such as FeN, FeXrNP, CoFeN or the like.

Then, an insulating layer 20a of about 0.3 to 0.6 μm in thickness made of an insulating material such as alumina is formed all over the surface by, for example, sputtering or CVD. Next, the thin film coil 21 for an inductive-type recording head made of, for example, copper (Cu) and a connecting portion 21a are formed about, for example, 1.0 to 2.0 μm in thickness with 1.2 to 2.0 μm coil pitch in a concave region formed by the bottom pole tip 19a and the bottom connecting portion 19b by, for example electroplating using the pattern of photoresist film 16 as a mask.

Figure 4A:
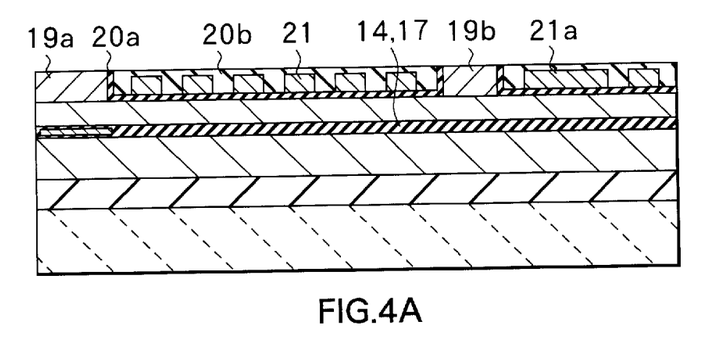
FIGS. 4A and 4B are cross sections for describing the following step shown in FIGS. 3A and 3B.
Figure 4B:
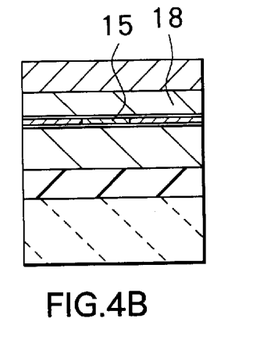

Next, as shown in FIGS. 4A and 4B, after removing the photoresist film 16, an insulating layer 20b of 3.0 to 4.0 μm in thickness made of an insulating material such as alumina is formed all over the surface by sputtering. Then, the surface is planarized by, for example, CMP so as to expose the surface of the bottom pole tip 19a. At this time, although the surface of the thin film coil 21 is not exposed in the embodiment, it may be exposed.

Figure 5A:
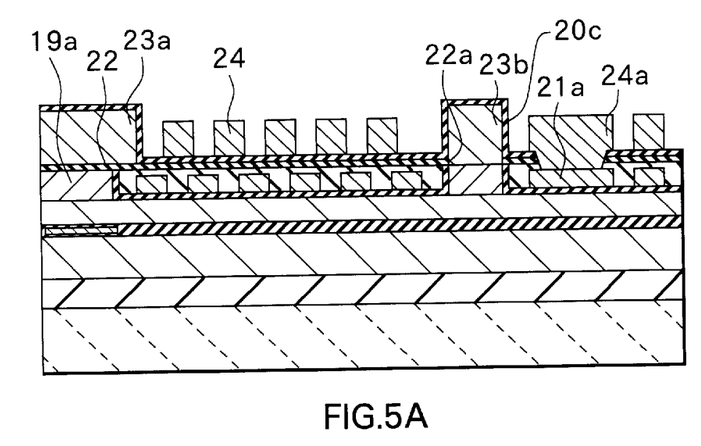
FIGS. 5A and 5B are cross sections for describing the following step shown in FIGS. 4A and 4B.
Figure 5B:
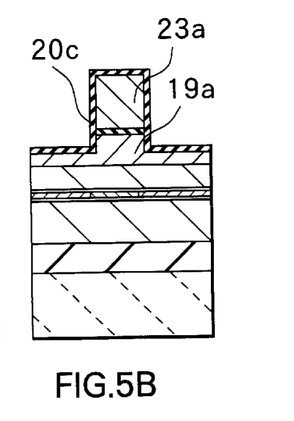

Next, as shown in FIGS. 5A and 5B, a write gap layer 22 of 0.2 to 0.3 μm in thickness made of an insulating material such as alumina is formed by sputtering. The write gap layer 22 may be formed of aluminum nitride (AlN), silicon oxide, silicon nitride or the like other than alumina. Then, an opening 22a for connecting the top pole and the bottom pole is formed through patterning the write gap layer 22 by photolithography.

A top pole tip 23a for determining the track width of a recording head is formed on the write gap layer 22 by photolithography. That is, a magnetic layer of 2.0 to 3.0 μm in thickness made of high-saturated-flux-density material (Hi-Bs materials) such as NiFe (Ni: 50% by weight, Fe: 50% by weight), NiFe (Ni: 80% by weight, Fe: 20% by weight), FeN, FeZrNP, CoFeN and so on is formed on the write gap layer 22 by, for example, sputtering. Then, the top pole tip 23a is formed through selectively removing the magnetic layer by ion milling with, for example, Ar (argon) using a photoresist mask. At the same time, a connecting portion 23b for magnetically connecting the top pole and the bottom pole is formed. The top pole tip 23a and the top connecting portion 23b may be etched by using a mask made of an inorganic insulating layer such as alumina instead of using a photoresist mask. Further, the top pole tip 23a and the top connecting portion 23b may be formed by plating or sputtering or the like other than such a method as photolithography.

In the embodiment, the top pole tip 23a is formed to be longer than the bottom pole tip 19a from the track surface to the inner side.

Then, with the top pole tip 23a being a mask, its peripheral region of the write gap layer 22 and the bottom pole tip 19a are etched in a self-aligned manner. That is, after selectively removing the write gap layer 22 by RIE (Reactive Ion Etching) with chlorine gas ($Cl_2$, $CF_4$, $BCl_2$, $SF_6$ and so on) using the top pole tip 23a as a mask, the exposed bottom pole tip 19a is further etched about 0.3 to 0.6 μm by, for example, ion milling with Ar so as to form a recording track with a trim structure.

Then, an insulating layer 20c of about 0.3 to 0.6 μm in thickness made of, for example, alumina is formed all over the surface by, for example, sputtering or CVD. The insulating layer 20c, the write gap 22 and the insulating layer 20b are selectively etched so as to expose the surface of the coil connecting portion 21a of the thin film coil 21. Next, a thin film coil 24 for an inductive-type recording head made of, for example, copper (Cu) and a coil connecting portion 24a are formed, for example, 2.0 to 3.0 μm in thickness, which is thicker than the thin film coil 21 and the coil connecting portion 21a with 1.5 to 3.0 μm coil pitch in a concave region on the insulating layer 20c formed by the top pole tip 23a and the top connecting portion 23b by, for example, electroplating. At this time, the thin film coils 21 and 24 are electrically connected to each other through the coil connecting portions 21a and 24a.

Figure 6A:
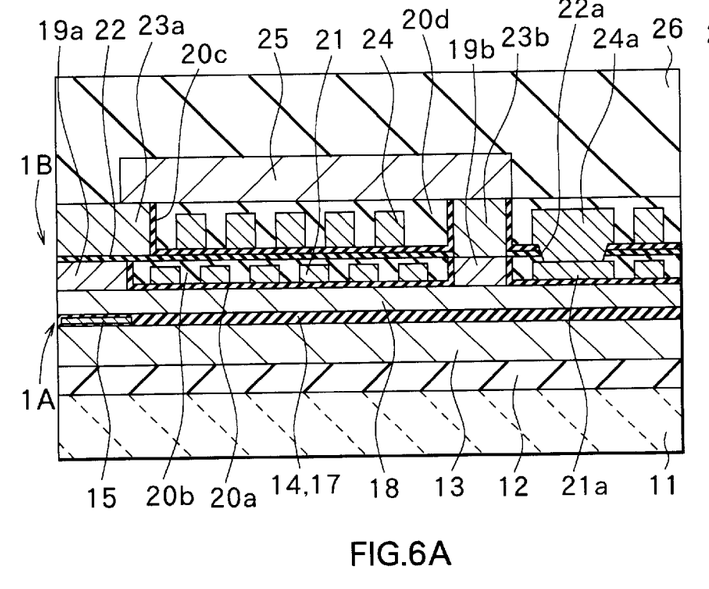
FIGS. 6A and 6B are cross sections for describing the following step shown in FIGS. 5A and 5B.
Figure 6B:
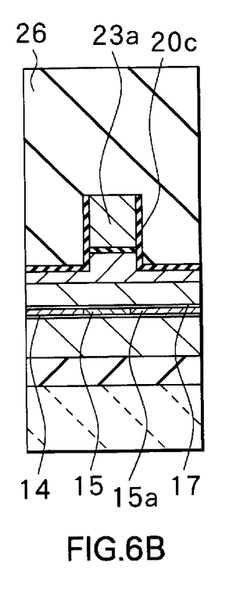

Next, as shown in FIGS. 6A and 6B, an insulating layer 20d about 3 to 4 μm in thickness made of, for example, alumina is formed all over the surface by, for example, sputtering or CVD. The insulating layer 20d and the insulating layer 20c may be formed of other insulating material such as silicon oxide ($SiO_2$), silicon nitride (SiN) and so on other than alumina. Then, the insulating layer 20d and the insulating layer 20c are etched to expose the surfaces of the top pole tip 23a and the top connecting portion 23b. The surfaces of the insulating layers 20c and 20d, and each surface of the top pole tip 23a and the top connecting portion 23b are planarized to form the same surface.

Next, a top pole layer 25 of about 2 to 3 μm in thickness is formed using, for example, the same material as the top pole tip 23a by, for example, electroplating or sputtering. The top pole layer 25 is in contact with the bottom connecting portion 19b through the top connecting portion 23b in a backward position of the thin film coils 21 and 24 from the track surface side, and is magnetically coupled to the bottom pole layer 18. At last, an overcoat layer 26 of about 30 μm in thickness made of alumina is formed on the top pole tip 23a, the top pole layer 25 and the insulating layer 20d by, for example, sputtering. After that, machine processing is performed on the slider to form the track surface (ABS) of a recording head and a reproducing head, and then, a thin film magnetic head is completed.

Figure 7:
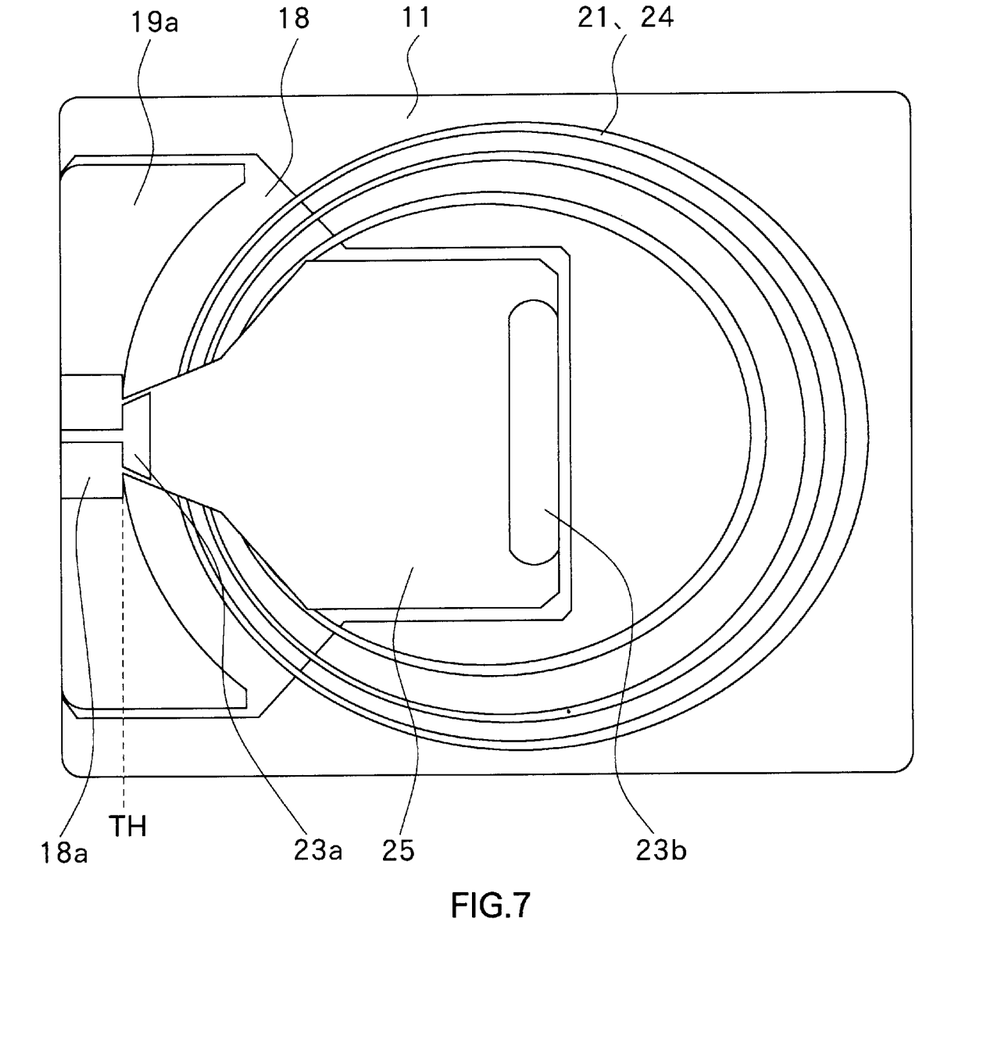
FIG. 7 is a plan view of a thin film magnetic head manufactured according to the first embodiment of the invention.

FIG. 7 is a plan view of a thin film magnetic head according to the embodiment. The figure shows the state before performing machine processing on the slider. In this figure, TH represents the throat height, and the throat height TH is determined by the end of the insulating layer 20a on the magnetic pole side, that is, the end of the bottom pole tip 19a on the opposite side of the track surface. In this figure, the throat height TH is coincide with the GMR height (TH=GMR). In the figure, 18a shows the trimmed region of the bottom pole layer 18 for the trim structure described above.

Effects in the followings can be obtained with the embodiment described heretofore.

(1) In the embodiment, the bottom pole is divided into the bottom pole tip 19a and the bottom pole layer 18, and the bottom pole tip 19a is formed on the flat surface of the bottom pole layer 18. As a result, the insulating layers 20a and 20b made of an inorganic insulating material can be buried in the concave between the bottom pole tip 19a and the bottom connecting portion 19b. Accordingly, the throat height is determined by the end of the insulating layer 20a on the bottom pole tip 19a side (that is, the end of the bottom pole tip 19a on the opposite side of the track surface). Therefore, precise control of the throat height can be performed without pattern shift of the end or deterioration of profile like the photoresist film of the related art. In addition, precise control of the MR height and the apex angle can be performed.

(2) In the embodiment, the thin film coil 24, which is the second layer, is thicker than the thin film coil 21, which is the first layer. The reason will be described in the followings.

It is because the Read-Write-Distance (RWD) is determined on the set of the hard disk drive (HDD) side. The RWD is a distance from the MR element 15 to the write gap layer 22. The RWD makes the suspension (gimbal) of the thin film magnetic head keep skewing on the hard disk in order to record and reproduce information. The skew angle at this time has a close correlation with the length of the RWD. The shorter the RWD (that is, the bottom pole layer 18 and the bottom pole tip 19a are thinner) is, the larger the skew angle becomes. As a result, a recording and reproducing capacity can be increased, since larger margin of writing and reading out information on/from the track can be attained. In general, the RWD is required to be as small as 2.5 to 3.5 $\mu$m.

In the embodiment, the bottom pole has a two-layered structure having the bottom pole layer 18 and the bottom pole tip 19a so that the film thickness of the thin film coil 21 is determined by the film thickness of the bottom pole tip 19a. Referring to an example, if the thickness of the bottom pole layer 18 is, for example, 1.5 $\mu$m and the thickness of the bottom pole tip 19a is, for example, 2.0 $\mu$m, the thickness of the thin film coil 21 is 1.5 $\mu$m provided that the film thickness of the insulating layer 20a between the thin film coil 21 and the bottom pole layer 18 is taken into consideration. However, the coil resistance increases in the thin film coil 21 of 1.5 $\mu$m, in thickness when the coil pitch of the thin film coil 21 is decreased in order to shorten the yoke length. Therefore, in the embodiment, the thin film coil 24 is formed thicker than the thin film coil 21 in order to decrease the whole coil resistance of the thin film coils 21 and 24. Thereby, the thin film coil 21 can be formed as thin as possible without increasing the coil resistance. As a result, the RWD can be decreased while a recording and reproducing capacity can be increased.

(3) In the embodiment, the top pole tip 23a is formed to be longer than the bottom pole tip 19a so that the contact area of the top pole tip 23a and the top pole layer 25 can be increased compared to the case where the top pole tip 23a and the bottom pole tip 19a have the same length. As a result, magnetic coupling of that area becomes excellent. Especially, this configuration is effective in the case where the top pole layer 25 is provided in a backward position of the track surface (recessed structure), as the embodiment. In other words, if the top pole layer 25 is formed in a position closer to the track surface than the throat height TH=0 (the end of the bottom pole tip 19a on the opposite side of the track surface), for example, in a position adjacent to the TH=0.5 $\mu$m, side-write, that is, information is written on the neighboring track by the top pole layer 25, occurs. Ideally, it is desired to form the top pole layer 25 in a position further from the track surface than the TH zero position. On the other hand, in the embodiment, the bottom pole tip 19a for determining the TH is magnetically coupled to the top pole layer 25 through the top pole tip 23a. The top pole tip 23a and the top pole layer 25 are required to be tightly connected in the opposite direction of the track surface from the TH zero position. Therefore, it is desired to form the top pole tip 23a to be longer than the bottom pole tip 19a.

(4) In the embodiment, as shown in FIG. 7, the width of the bottom pole tip 19a is formed wider than that of the top pole tip 23a when looking at each pattern from the right above. As a result, there is no saturation of magnetic flux in the neighboring area of the bottom pole tip 19a even if the top pole tip 23a is a narrow track with a half-micron width.

(5) In addition, in the embodiment, the inorganic insulating layers 20a and 20b are formed between the thin film coil 21 and the top shield-cumbottom pole layer 18. Also, the write gap film 22 and the insulating layer 20c are formed between the thin film coil 21 and the thin film coil 24. Therefore, a large insulation resistance can be obtained between the thin film coils 21, 24 and the top shield, respectively. As a result, the insulating characteristic can be maintained while leaking of magnetic flux from the thin film coils 21 and 24 can be decreased.

(6) In the embodiment, the top pole is divided into the top pole tip 23a and the top pole layer 25, and the top pole tip 23a is formed on the flat surface of the bottom pole tip 19a. As a result, the top pole tip 23a which determines the recording track width can be formed to submicron measurement with high precision. In addition, in the embodiment, the thin film coil 21, which is the first layer, is buried in the concave region adjacent to the bottom pole tip 19a by the insulating layer 20b. At the same time, the surface of the insulating layer 20b is planarized to form to be the same surface as the surface of the bottom pole tip 19a. Hence, the difference in height of the apex area including the thin film coil 24, which is the second layer, is decreased for the height of the thin film coil 21 compared to the configuration of the related art. Therefore, the difference in the thickness of the photoresist films in the top and bottom of the apex area is decreased when forming the top pole layer 25 which is partially in contact with the top pole tip 23a by photolithography. As a result, the top pole layer 25 can be minutely formed to submicron measurement.

Therefore, a high surface density recording by a recording head can be performed in the thin film magnetic head according to the embodiment, and the performance of the recording head can be further improved by stacking the coil to two, three or more layers. Furthermore, the pole tip 23a and the top pole layer 25 can be minutely formed with high precision by using an inorganic insulating layer as a mask instead of using the photoresist at the time of performing photolithography on the top pole tip 23a and the top pole layer 25. The influence of the difference in height of the apex area is also decreased in the case where the top pole tip 23a and the top pole layer 25 are formed by such as sputtering other than photolithography so that the pole tip 23a and the top pole layer 25 can be minutely formed.

(7) Moreover, in the embodiment, there is no slope in the photoresist pattern like in the related art. Therefore, the first and the second layers of thin film coils 21 and 24 can both be formed on the flat surface so that the distance from the peripheral end of the coil and the throat height zero position by the slope does not prevent the yoke length from shortening. As a result, the yoke length can be shortened and the high frequency characteristic of the recording head can be remarkably improved. Incidentally, in the embodiment, the yoke length can be shortened to equal to or less than 50% of the related art since the distance can be designed to be 0.1 to 0.2 µm which is an error of positioning of the photolithography.

(8) In the embodiment, the magnetic layers such as the top pole tip 23a, the top pole layer 25 and so on are formed of a high saturation magnetic flux density (Hi-Bs) material. As a result, the magnetic flux generated in the thin film coils 21 and 24 effectively reaches the top pole tip 23a and the bottom pole tip 19a without being saturated on the way even if the track width becomes narrow. Thereby, a recording head with no magnetic loss can be implemented.

(9) Moreover, in the embodiment, the top pole layer 25 formed on the top pole tip 23a for determining the track width is not exposed on the track surface. Therefore, a side-write by the top pole layer 25 does not occur.

[Second Embodiment]

Figure 8A:
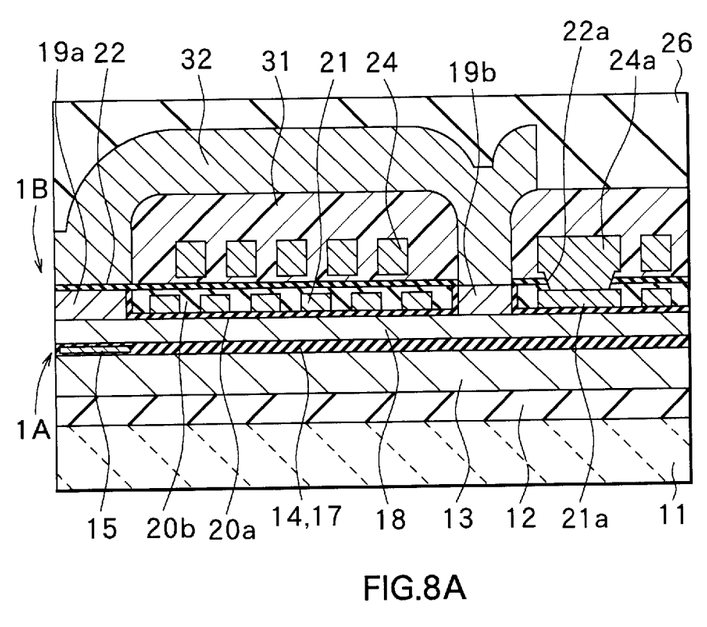
FIGS. 8A and 8B are cross sections for describing the configuration of a thin film magnetic head according to a second embodiment of the invention.
Figure 8B:
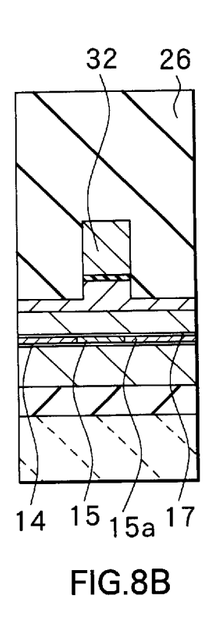

FIGS. 8A and 8B show the configuration of a composite thin film magnetic head according to the second embodiment of the invention. The manufacturing step of the second embodiment until forming the second layer of thin film coil 24 is the same as that of the first embodiment. Then, the thin film coil 24 is covered with a photoresist film 31 and a top pole layer 32 of 2.5 to 3.5 µm in thickness is formed thereon. In the embodiment, the film thickness of the thin film coil 24, which is the second layer, is formed thicker than that of the thin film coil 21, which is the first layer, as well as the first embodiment.

In the embodiment, unlike the first embodiment, it is not necessary to planarize the thin film coil 24 by CMP after forming the thin film coil 24. Accordingly, manufacturing cost can be decreased compared to the first embodiment. The thin film coil 24 with five turns is formed on the planarized portion of the thin film coil 21 with six turns. Therefore, the distance from peripheral end of the thin film coil 24 to the throat height zero position does not prevent the yoke length from shortening. Other configurations and effects are identical to those of the first embodiment so that the description will be omitted.

Although the invention has been described by referring to the embodiments, the invention is not limited to the embodiments but various modification can be applicable. For example, in the above-mentioned embodiment, an example of using a high saturation magnetic flux density material such as NiFe (Ni: 50% by weight, Fe: 50% by weight), NiFe (Ni: 80% by weight %, Fe: 20% by weight), FeN, FeCoZr and so on for the top pole tip 23a and the top pole layer 25 or the like. However, they may have a configuration in which two or more kinds of these materials may be stacked.

In the first embodiment, a configuration in which the top pole layer 25 is formed in a backward position of the track surface (recessed structure) is described. However, it may have a configuration in which both of the top pole layer 25 and the top pole tip 23a are exposed to the track surface by making the thickness of the top pole layer 25 relatively thicker than that of the top pole tip 23a. Thereby, side-write by the top pole layer 25 can be suppressed even if it does not have a recessed structure.

Furthermore, in the above-mentioned embodiment, the first layer of thin film coil is buried with an insulating layer in the concave region adjacent to the bottom pole tip 19a. However, the whole concave region may be an inorganic insulating layer made of such as alumina without burying the thin film coil. In addition, in the above-mentioned embodiment, although the bottom pole is corresponded to the first magnetic layer and the top pole is corresponded to the second magnetic layer, respectively, reverse correspondence can be applicable. In other words, the bottom pole may be corresponded to the second magnetic layer and the top pole may be corresponded to the first magnetic layer, respectively.

As described, in a thin film magnetic head and a method of manufacturing the thin film magnetic head of the invention, the first magnetic pole is formed to be protruded on the first magnetic layer and the first thin film coil is formed in a concave region adjacent to the first magnetic pole. At the same time, the second thin film coil is formed thicker than the first thin film coil so that an insulating layer made of an inorganic material can be buried in the concave region adjacent to the first magnetic pole. Therefore, the throat height is determined by the end of the first magnetic pole on the side opposite to the track surface. As a result, there is no pattern shift of the end or no deterioration of profile like the photoresist film of the related art, and precise control of the throat height can be performed.

Furthermore, the difference in height of the apex area can be decreased compared to the configuration of the related art by burying the thin film coil in the concave region adjacent to the first magnetic pole. Thereby, in the manufacturing step thereafter, the difference in thickness of the photoresist film in the top and the bottom of the apex area can be decreased when forming the second magnetic layer by photolithography. As a result, the second magnetic layer can be minutely formed to submicron measurement. Therefore, high surface density recording of a recording head can be performed, and the performance of the recording head can be further improved by stacking the coil to two, three or more layers.

In addition, the coil resistance is decreased by forming the second thin film coil thicker than the first thin film coil so that the first thin film coil can be formed as thin as possible. As a result, a recording and reproducing capacity can be increased by making the RWD smaller and the skew angle larger.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head including: a magnetoresistive element; at least two magnetic layers including a first magnetic pole and a second magnetic pole, which are magnetically coupled while part of the side facing a recording medium oppose each other with a write gap layer in between; and a thin film coil with two or more layers for generating magnetic flux; wherein the thin film magnetic head comprises:

a first magnetic layer formed on the side closer to the magnetoresistive element, which is one of the two magnetic layers;

a first magnetic pole which is formed separately from the first magnetic layer while the opposite surface of the surface adjacent to the write gap layer is magnetically coupled to part of the region of the first magnetic layer;

an insulating layer which is formed of an inorganic material and is formed extendedly at least from a surface of the first magnetic pole, which is the opposite side of a surface facing the recording medium, to one of the surface of the first magnetic layer;

a first thin film coil formed with at least part of the film-thickness direction being located in the region where the insulating layer is formed;

a second magnetic layer including a second magnetic pole which opposes the first magnetic pole with the write gap layer in between; and a second thin film coil with one, two or more layers with thicker film thickness than the first thin film coil, which is formed in a position more distant from the magnetoresistive element than the first thin film coil while electrically connected to the first thin film coil.

2. A thin film magnetic head according to claim 1 wherein the second magnetic pole is formed separately from the second magnetic layer while the second magnetic layer is magnetically coupled to the second magnetic pole in at least part of the surface of the second magnetic pole which is opposite to the surface adjacent to the write gap layer.

3. A thin film magnetic head according to claim 2 wherein the film thickness of the second magnetic pole is thicker than that of the first magnetic pole.

4. A thin film magnetic head according to claim 2 wherein the end of the surface of the second magnetic layer facing the recording medium is formed in a rearward position of the surface facing the recording medium.

5. A thin film magnetic head according to claim 1 wherein the length from the surface of the first magnetic pole opposing the recording medium is equal to the throat height of a recording head.

6. A thin film magnetic head according to claim 1 wherein the insulating layer includes a first insulating layer formed extendedly at least from a surface of the first magnetic pole, which is the opposite side of a surface facing the recording medium, to one of the surface of the first magnetic layer; and a second insulating layer formed at least in between the turns of the first thin film coil.

7. A thin film magnetic head according to claim 6 wherein a third insulating layer is further formed extendedly at least from a surface of the second magnetic pole, which is opposite to a surface facing the recording medium, to the surface of the write gap layer which is opposite to the surface adjacent to the second magnetic pole.

8. A thin film magnetic head according to claim 7 wherein the second thin film coil is covered with other insulating layer than the first to the third insulating layers in between the third insulating layer and the second magnetic layer.

9. A thin film magnetic head according to claim 8 wherein the third insulating layer and the other insulating layer is formed to be substantially the same surface as the surface of the second magnetic pole which is opposite to the surface adjacent to the write gap layer.

10. A thin film magnetic head according to claim 1 wherein the surface of the insulating layer which is opposite to the surface adjacent to the first magnetic layer is formed to be substantially the same surface as the surface of the first magnetic pole which is opposite to the surface adjacent to the write gap layer.

11. A thin film magnetic head according to claim 1 wherein the width along the surface of the first magnetic pole facing the recording medium is formed wider than the width of the second magnetic pole.

12. A method of manufacturing a thin film magnetic head including: a magnetoresistive element; at least two magnetic layers including a first magnetic pole and a second magnetic pole, which are magnetically coupled while part of the side facing a recording medium oppose each other with a write gap layer in between; and a thin film coil with two or more layers for generating magnetic flux; wherein the method includes the steps of:

forming the first magnetic layer after forming the magnetoresistive element, and forming the first magnetic pole on the first magnetic layer to be magnetically coupled to part of the region of the first magnetic layer;

forming an insulating layer made of an inorganic material at least from a surface of the first magnetic pole, which is opposite to a surface facing the recording medium, to one of the side of the first magnetic layer extendedly;

forming a first thin film coil in the concave region where the insulating layer is formed;

forming a second thin film coil with one, two or more layers with thicker thickness than that of the first thin film coil while electrically connecting to the first thin film coil after forming the first thin film coil; and forming a write gap layer at least on the first magnetic pole and then forming a second magnetic layer including the second magnetic pole so as to cover the second thin film coil.

13. A method of manufacturing a thin film magnetic head according to claim 12 wherein the second magnetic pole is formed on the write gap layer which is formed on the first magnetic pole by dividing the second magnetic pole and the second magnetic layer and then the second magnetic layer is formed to be magnetically coupled to the second magnetic pole.

14. A method of manufacturing a thin film magnetic head according to claim 13 wherein the film thickness of the second magnetic pole is formed thicker than that of the first magnetic pole.

15. A method of manufacturing a thin film magnetic head according to claim 13 wherein the length from the surface of the first magnetic pole opposing the recording medium is formed to be equal to the throat height of a recording head.

16. A method of manufacturing a thin film magnetic head according to claim 13 including the steps of: forming a first insulating layer extendedly from a surface of the first magnetic pole, which is opposite to a surface facing the recording medium, to one of the surface of the first magnetic layer; and forming a second insulating layer at least in between the turns of the first thin film coil.

17. A method of manufacturing a thin film coil according to claim 16 including the step of planarizing the surface of the second insulating layer which is opposite to the surface adjacent to the first magnetic layer so that the surface of the second insulating layer forms substantially the same surface as the surface of the first magnetic pole which is opposite to the surface adjacent to the write gap layer.

18. A method of manufacturing a thin film magnetic head according to claim 16 wherein a third insulating layer is further formed extendedly at least from a surface of the second magnetic pole, which is opposite to a surface facing the recording medium, to the surface of the write gap layer which is opposite to the surface adjacent to the second magnetic pole.

19. A method of manufacturing a thin film magnetic head according to claim 18 wherein the second thin film coil is covered with other insulating layer than the first to the third insulating layers in between the third insulating layer and the second magnetic layer.

20. A method of manufacturing a thin film magnetic head according to claim 19 wherein the third insulating layer and the other insulating layer are planarized to be substantially the same surface as the surface of the second magnetic pole which is opposite to the surface adjacent to the write gap layer.

21. A method of manufacturing a thin film magnetic head according to claim 12 wherein the width along the surface of the first magnetic pole facing the recording medium is formed wider than the width of the second magnetic pole.

22. A method of manufacturing a thin film magnetic head according to claim 12 wherein the end of the surface of the second magnetic layer facing the recording medium is formed in a rearward position of the surface facing the recording medium.

* * * * *